US010532852B2

(12) United States Patent
Apps et al.

(10) Patent No.: US 10,532,852 B2
(45) Date of Patent: Jan. 14, 2020

(54) FIRE RETARDANT PALLET ASSEMBLY

(71) Applicant: Rehrig Pacific Company, Los Angeles, CA (US)

(72) Inventors: William P. Apps, Alpharetta, GA (US); Christopher N. Gab, Shawnee, KS (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 16/006,923

(22) Filed: Jun. 13, 2018

(65) Prior Publication Data

US 2019/0135485 A1 May 9, 2019

Related U.S. Application Data

(60) Provisional application No. 62/518,783, filed on Jun. 13, 2017.

(51) Int. Cl.
*B65D 19/00* (2006.01)

(52) U.S. Cl.
CPC .............. *B65D 19/0036* (2013.01); *B65D 2519/00034* (2013.01); *B65D 2519/00069* (2013.01); *B65D 2519/0086* (2013.01); *B65D 2519/00149* (2013.01); *B65D 2519/00273* (2013.01); *B65D 2519/00288* (2013.01); *B65D 2519/00303* (2013.01); *B65D 2519/00318* (2013.01); *B65D 2519/00363* (2013.01); *B65D 2519/00432* (2013.01)

(58) Field of Classification Search
CPC ............ B65D 19/0004; B65D 19/0006; B65D 19/001; B65D 19/0016; B65D 19/003
See application file for complete search history.

(56) References Cited

U.S. PATENT DOCUMENTS

| 2,602,619 | A | 7/1952 | McIntyre |
| 2,699,912 | A | 1/1955 | Cushman |
| 3,467,032 | A | 9/1969 | Rowlands et al. |
| 3,628,468 | A | 12/1971 | Angelbeck, et al. |
| 3,664,271 | A | 5/1972 | Wolder et al. |
| 3,680,496 | A | 8/1972 | Westlake, Jr. |
| 3,710,733 | A | 1/1973 | Story |
| 3,832,955 | A | 9/1974 | Pottinger et al. |
| 3,875,280 | A | 4/1975 | Story |

(Continued)

FOREIGN PATENT DOCUMENTS

| DE | 2125549 | 12/1972 |
| DE | 3205910 | 11/1983 |

(Continued)

*Primary Examiner* — Daniel J Rohrhoff
(74) *Attorney, Agent, or Firm* — Carlson, Gaskey & Olds, P.C.

(57) ABSTRACT

A pallet assembly includes an upper portion including an upper deck and a plurality of upper column portions extending downward from the upper deck. A lower portion includes a plurality of lower column portions extending upward and a plurality of runners connecting the plurality of lower column portions. An upper reinforcement member is between an upper surface of the lower column portions and a lower surface of the upper deck. A lower reinforcement member between a lower surface of the upper column portions and an upper surface of the runners.

23 Claims, 12 Drawing Sheets

(56) References Cited

U.S. PATENT DOCUMENTS

| | | | |
|---|---|---|---|
| 3,938,448 A | 2/1976 | Nishitani et al. |
| 4,019,634 A | 4/1977 | Bonnot |
| 4,159,681 A | 7/1979 | Vandament |
| 4,183,491 A | 1/1980 | Sanders et al. |
| 4,242,150 A | 12/1980 | Maxwell |
| 4,316,419 A | 2/1982 | Cupido |
| 4,487,136 A | 12/1984 | Beckway |
| 4,597,338 A | 7/1986 | Kreeger |
| 4,604,014 A | 8/1986 | Frano |
| 4,606,278 A | 8/1986 | Shuert |
| 4,735,154 A | 4/1988 | Hemery |
| 4,843,976 A | 7/1989 | Pigott et al. |
| 4,850,284 A | 7/1989 | DeGroot et al. |
| 4,879,956 A | 11/1989 | Shuert |
| 5,042,396 A | 8/1991 | Shuert |
| 5,094,175 A | 3/1992 | Christie |
| 5,117,762 A | 6/1992 | Shuert |
| 5,160,029 A | 11/1992 | Pigott et al. |
| 5,197,395 A | 3/1993 | Pigott et al. |
| 5,197,396 A | 3/1993 | Breezer et al. |
| 5,289,781 A | 3/1994 | Beckway |
| 5,343,814 A | 9/1994 | Pigott et al. |
| 5,351,629 A | 10/1994 | Breezer et al. |
| 5,367,961 A | 11/1994 | Arai et al. |
| 5,390,467 A | 2/1995 | Shuert |
| 5,401,347 A | 3/1995 | Shuert |
| 5,404,829 A | 4/1995 | Shuert |
| 5,408,937 A | 4/1995 | Knight, IV et al. |
| 5,413,052 A | 5/1995 | Breezer et al. |
| 5,483,899 A | 1/1996 | Christie |
| 5,520,120 A | 5/1996 | Badger |
| 5,579,686 A | 12/1996 | Pigott et al. |
| 5,687,532 A | 11/1997 | Torrey |
| 5,736,221 A | 4/1998 | Hardigg et al. |
| 5,758,855 A | 6/1998 | Jordan et al. |
| 5,791,262 A | 8/1998 | Knight et al. |
| 5,868,080 A | 2/1999 | Wyler et al. |
| 5,887,529 A | 3/1999 | John et al. |
| 5,890,437 A | 4/1999 | Hill |
| 5,894,803 A | 4/1999 | Kuga |
| 5,937,767 A | 8/1999 | Togawa et al. |
| 5,950,546 A | 9/1999 | Brown et al. |
| 5,996,508 A | 12/1999 | Constantino et al. |
| 6,006,677 A | 12/1999 | Apps et al. |
| 6,021,721 A | 2/2000 | Rushton |
| 6,029,583 A | 2/2000 | LeTrudet |
| 6,053,466 A | 4/2000 | Jordan et al. |
| 6,095,061 A | 8/2000 | Perazzo |
| 6,109,190 A | 8/2000 | Hale et al. |
| 6,123,032 A | 9/2000 | Ohanesian |
| 6,125,770 A | 10/2000 | Brandenburg |
| 6,138,582 A | 10/2000 | Fujii et al. |
| 6,173,657 B1 | 1/2001 | Espejo |
| 6,173,659 B1 | 1/2001 | Danks et al. |
| 6,199,488 B1 | 3/2001 | Favaron et al. |
| 6,237,509 B1 | 5/2001 | Ishido et al. |
| 6,250,234 B1 | 6/2001 | Apps |
| 6,263,807 B1 | 7/2001 | Fox et al. |
| 6,283,044 B1 | 9/2001 | Apps |
| 6,289,823 B1 | 9/2001 | Koefelda et al. |
| 6,305,301 B1 | 10/2001 | Piper, Jr. et al. |
| 6,357,366 B1 | 3/2002 | Frankenberg |
| 6,389,990 B1 | 5/2002 | Apps |
| 6,446,563 B1 | 9/2002 | Ohanesian |
| 6,705,237 B2 | 3/2004 | Moore, Jr. et al. |
| 6,718,888 B2 | 4/2004 | Muirhead |
| 6,745,703 B2 | 6/2004 | Torrey et al. |
| 6,748,876 B2 | 6/2004 | Preisler et al. |
| 6,784,234 B2 | 8/2004 | Adedeji et al. |
| 6,807,910 B2 * | 10/2004 | Apps .................. B65D 19/0012 108/57.25 |
| 7,779,763 B2 * | 8/2010 | Valentinsson ...... B65D 19/0014 108/55.1 |
| 7,779,765 B2 | 8/2010 | Donnell, Jr. et al. |
| 7,798,465 B1 | 9/2010 | Meverden |
| 7,845,113 B2 | 12/2010 | Casimaty et al. |
| 7,908,979 B2 | 3/2011 | Yoshida et al. |
| 7,918,166 B2 | 4/2011 | Apps et al. |
| 8,118,164 B2 | 2/2012 | Brown |
| 8,291,838 B2 * | 10/2012 | Apps .................. B65D 19/0012 108/57.25 |
| 8,770,115 B2 * | 7/2014 | Apps .................. B65D 19/0004 108/57.25 |
| 8,776,697 B1 | 7/2014 | O'Connell |
| 8,943,981 B2 | 2/2015 | Kelly et al. |
| D751,789 S | 3/2016 | Cote et al. |
| 9,272,810 B2 | 3/2016 | Ogburn |
| 9,452,864 B2 * | 9/2016 | Apps .................. B29C 45/0003 |
| 9,511,897 B2 * | 12/2016 | Liao .................. B65D 19/0095 |
| 9,511,898 B2 * | 12/2016 | Liao .................. B65D 19/0097 |
| 9,669,962 B2 * | 6/2017 | Liao .................. B65D 19/0095 |
| D796,774 S | 9/2017 | Simmons et al. |
| 9,802,732 B2 | 10/2017 | Clark et al. |
| D816,939 S | 5/2018 | Blosser et al. |
| 10,053,261 B2 | 8/2018 | Storteboom et al. |
| 10,081,454 B2 | 9/2018 | Storteboom et al. |
| 10,118,731 B2 * | 11/2018 | Apps .................. B65D 19/0069 |
| 2001/0029874 A1 | 10/2001 | Muirhead |
| 2001/0031807 A1 | 10/2001 | Adedeji et al. |
| 2002/0104465 A1 | 8/2002 | Ohanesian |
| 2002/0134284 A1 | 9/2002 | Apps |
| 2003/0075082 A1 | 4/2003 | Apps |
| 2003/0079658 A1 | 5/2003 | Torrey et al. |
| 2003/0079660 A1 | 5/2003 | Torrey et al. |
| 2005/0103237 A1 | 5/2005 | Moore, Jr. et al. |
| 2005/0145145 A1 * | 7/2005 | Ogburn ............. B65D 19/0012 108/57.25 |
| 2006/0201400 A1 | 9/2006 | Moore, Jr. et al. |
| 2006/0201402 A1 * | 9/2006 | Moore, Jr. ......... B65D 19/0012 108/57.25 |
| 2006/0236904 A1 | 10/2006 | Apps et al. |
| 2007/0062420 A1 | 3/2007 | Apps et al. |
| 2007/0163473 A1 * | 7/2007 | Shuert ................ B65D 19/0016 108/57.25 |
| 2008/0143514 A1 | 6/2008 | Valentinsson |
| 2008/0210140 A1 | 9/2008 | Valentinsson |
| 2008/0236454 A1 | 10/2008 | Naidu et al. |
| 2009/0050029 A1 | 2/2009 | Ogburn |
| 2010/0083881 A1 | 4/2010 | Apps et al. |
| 2010/0154685 A1 | 6/2010 | Arinstein |
| 2011/0120353 A1 * | 5/2011 | Jensen ............... B65D 19/0016 108/57.25 |
| 2011/0259249 A1 | 10/2011 | Ogburn et al. |
| 2012/0160734 A1 | 6/2012 | Linares |
| 2013/0220184 A1 * | 8/2013 | Apps .................. B65D 19/0004 108/56.1 |
| 2014/0158025 A1 | 6/2014 | Apps |
| 2014/0261103 A1 * | 9/2014 | Kelly ................. B65D 19/0006 108/57.28 |
| 2016/0068302 A1 | 3/2016 | Clark et al. |
| 2016/0137342 A1 | 5/2016 | Liao et al. |
| 2016/0221714 A1 | 8/2016 | Liao et al. |
| 2016/0236815 A1 | 8/2016 | Liao et al. |
| 2016/0288951 A1 * | 10/2016 | Rader ................ B65D 19/0016 |
| 2018/0322453 A1 * | 11/2018 | Lantz ................ G06Q 10/0833 |

FOREIGN PATENT DOCUMENTS

| | | |
|---|---|---|
| EP | 68586 | 1/1983 |
| EP | 997383 | 5/2000 |
| EP | 1973788 | 10/2008 |
| GB | 1479181 | 7/1977 |
| GB | 2272203 | 5/1994 |
| JP | 2008114913 | 5/2008 |
| WO | 9001448 | 2/1990 |
| WO | 9935041 | 7/1999 |
| WO | 00001588 A1 | 1/2000 |
| WO | 00020495 | 4/2000 |
| WO | 0164526 | 7/2001 |
| WO | 0216214 | 2/2002 |
| WO | 03035495 | 1/2003 |
| WO | 03035496 | 1/2003 |
| WO | 2004096652 | 11/2004 |

(56) References Cited

FOREIGN PATENT DOCUMENTS

| WO | 2005118412 | 12/2005 |
|----|------------|---------|
| WO | 2007087065 A2 | 8/2007 |
| WO | 2009099314 | 8/2009 |
| WO | 2010008264 | 1/2010 |
| WO | 2018093481 | 5/2018 |

* cited by examiner

US 10,532,852 B2

FIRE RETARDANT PALLET ASSEMBLY

BACKGROUND

Pallets are used to store and transport goods thereon by supporting them above fork-tine receiving openings above the floor. Plastic pallets often including an upper deck supported by columns and runners interconnecting bottom ends of the columns.

Pallets that are used to transport foods should have all surfaces accessible to be washed. All surfaces should also be capable of being swabbed to test for contamination.

In order to meet some stiffness and load capacity requirements, reinforcements (often steel) may be secured to an underside of the deck and/or the runners. This can complicate the requirement to make all surfaces of the pallet assembly washable and capable of being swabbed.

Another potentially competing design requirement is fire performance. Fire resistant additives can impair the performance of the plastic components. Fire resistant coatings can make recycling the plastic components more difficult.

SUMMARY

A pallet assembly includes an upper portion including an upper deck and a plurality of upper column portions extending downward from the upper deck. A lower portion includes a plurality of lower column portions extending upward and a plurality of runners connecting the plurality of lower column portions. An upper reinforcement member is between an upper surface of the lower column portions and a lower surface of the upper deck. A lower reinforcement member between a lower surface of the upper column portions and an upper surface of the runners.

These and other features are described in more detail below. Many of these features can be practiced independently of one another with some benefit, and not all of the features address one or more of the issues raised in the Background above. However, some combinations of the features do provide a particular benefit.

DETAILED DESCRIPTION

Figure 1:
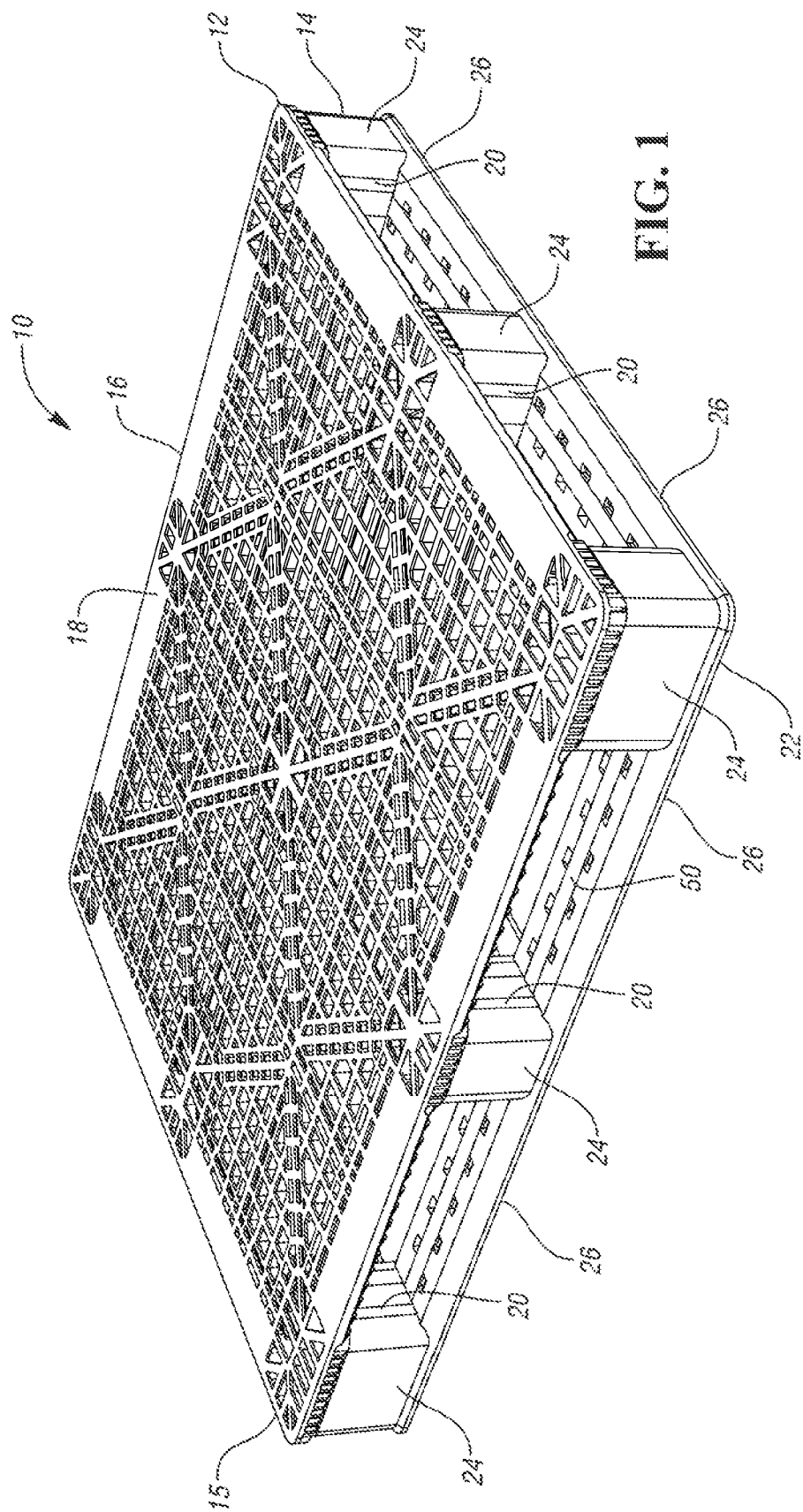
FIG. 1 is a perspective view of a pallet assembly according to one embodiment.

A pallet assembly 10 according to one embodiment of the present invention is shown in FIG. 1. The pallet assembly 10 generally includes an upper assembly 12 and a lower assembly 14. The upper assembly 12 includes an upper portion 15 including an upper deck 16 having an upper support surface on a generally planar upper planar portion 18 (or sheet). The upper portion 15 further includes a plurality of upper column portions 20 protruding downwardly from the upper deck 16, with the upper column portions 20 and the upper deck 16 molded integrally as a single piece of plastic.

The lower assembly 14 includes an integrally molded, single-piece plastic lower portion 22 including a plurality of lower column portions 24 with runners 26 extending therebetween. The runners 26 collectively can be considered a lower deck. A lower reinforcement frame 50 is received in the lower portion 22, extending along the runners 26 and through the lower column portions 24. The upper column portions 20 and the lower column portions 24 together form columns between the upper deck 16 and the runners 26 (or lower deck).

Figure 2:
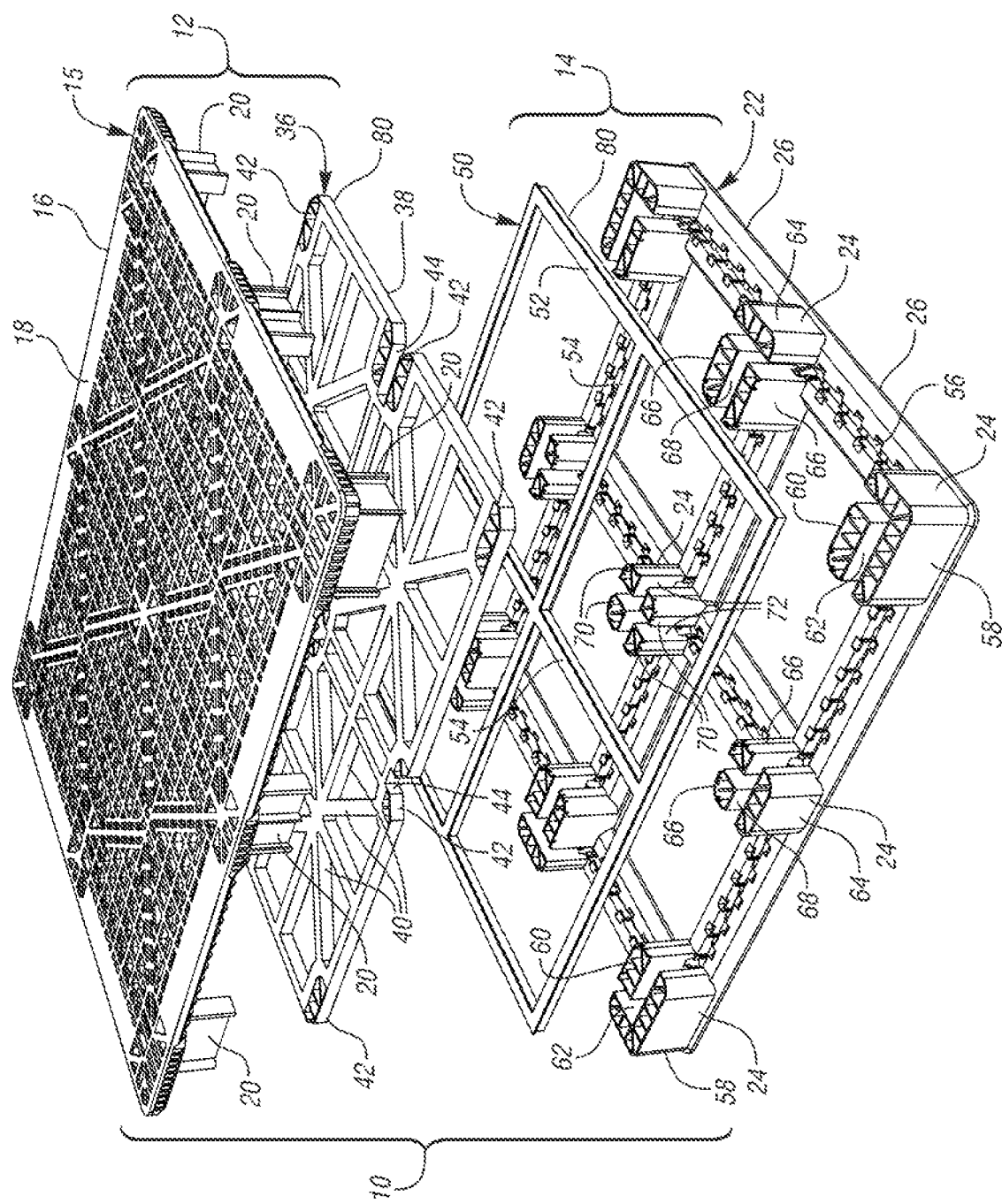
FIG. 2 is an exploded upper perspective view of the pallet assembly of FIG. 1.

FIG. 2 is an exploded view of the pallet assembly 10. The upper assembly 12 includes the upper portion 15 and an upper reinforcement frame 36. The upper portion 15, including the upper deck 16 and upper column portions 20, is injection molded as a single piece of plastic, such as polypropylene or HDPE. The reinforcement frame 36 may be plastic, metal or other suitable stiff material, but in the example shown is injection molded as a single piece from a stiff composite material, such as glass-filled Nylon or carbon-fiber filled Nylon. The reinforcement frame 36 includes a peripheral rod portion 38 and a plurality of intersecting internal rod portions 40. Aligned with each lower column portion 24 (and adjacent each upper column portion 20) is a higher concentration of column ribs 42, which may align with ribs in the lower column portions 24 to transfer loads from the upper planar portion 18 of the deck 16 to the lower column portions 24. A notch 44 is defined by the column ribs 42 that aligns with each of the non-corner peripheral lower column portions 24, also forming a notch 44 in the periphery of the upper reinforcement frame 36. These notches 44 are configured to receive portions of the upper column portions 20.

The lower assembly 14 includes the lower portion 22 and a lower reinforcement frame 50. The lower portion 22 is integrally injection molded as a single piece of plastic (such as polypropylene or HDPE) including the lower column portions 24 and runners 26. The lower reinforcement frame 50 includes a plurality of peripheral rod portion 52 around a periphery. Intersecting internal rod portions 54 may extend along a longitudinal and lateral center lines of the lower reinforcement frame 50. The lower reinforcement frame 50 may be metal (such as steel or aluminum) or injected molded of plastic or a reinforced polymer material, such as glass-filled Nylon or carbon-fiber filled Nylon.

The lower reinforcement frame 50 is configured to be received in a channel 56 in the lower portion 22 that extends through the runners 26 and through the lower column portions 24. The corner lower column portions 24 are formed as an outer corner portion 58 spaced outward of an inner corner portion 60 defining an L-shaped channel 62 therebetween. The non-corner peripheral lower column portions 24 are each formed as an outer side portion 64 spaced outward of two spaced-apart inner side portions 66 defining a T-shaped channel 68 therebetween. The center lower column portion 24 is formed as four spaced-apart inner center portions 70 defining a x-shaped channel 72 therebetween.

In the example pallet assembly 10 shown, a fire retardant coating 80, such as intumescent material, may be placed on the upper reinforcement frame 36 and the lower reinforcement frame 50. Some or all of the surfaces of the upper reinforcement frame 36 and the lower reinforcement frame 50 may be coated with the fire retardant coating 80.

Figure 3:
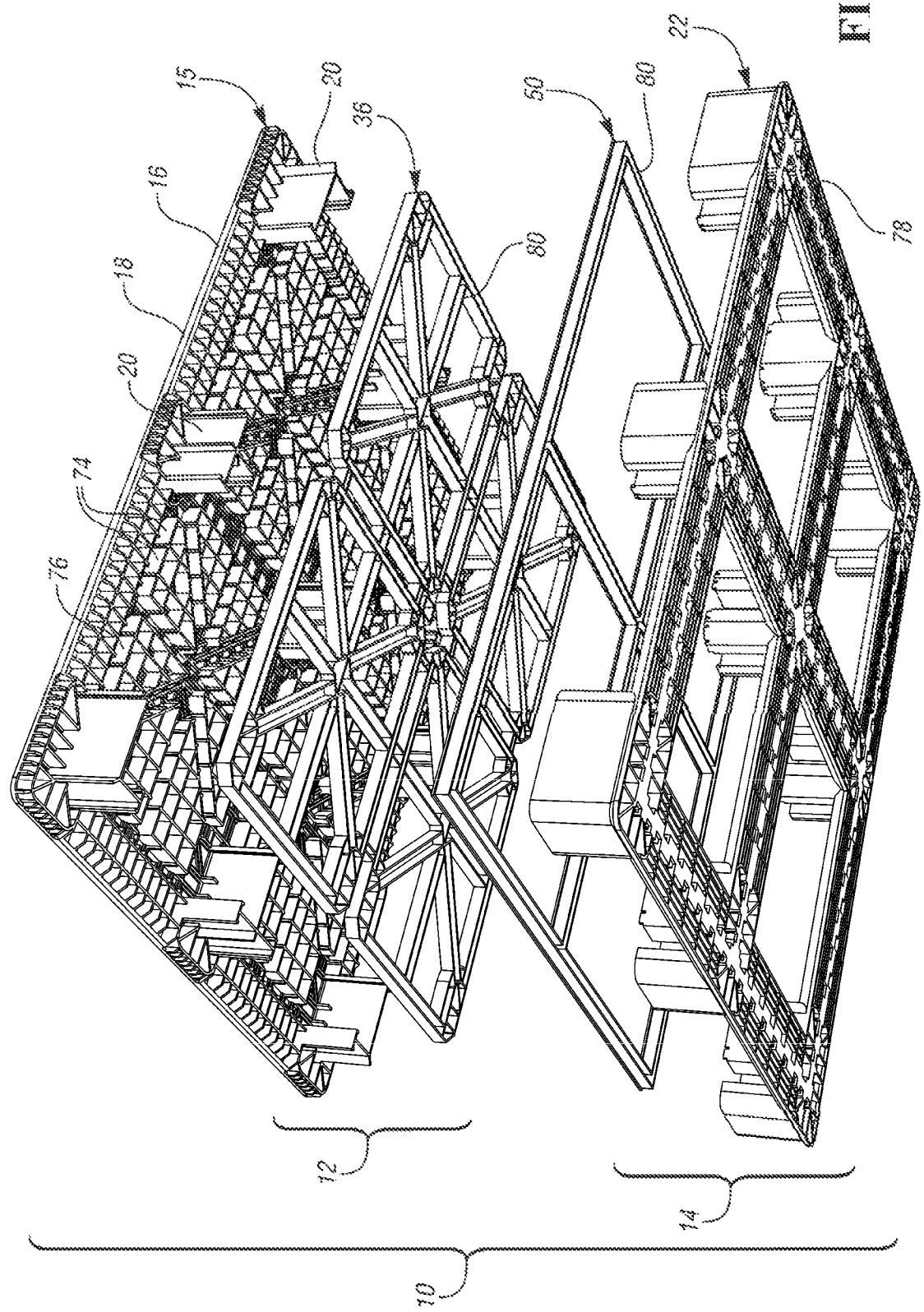
FIG. 3 is an exploded lower perspective view of the pallet assembly of FIG. 1.

FIG. 3 is an exploded bottom perspective view of the pallet assembly 10. The upper deck 16 includes a plurality of ribs 74 extending downwardly from the upper planar portion 18 and defining a plurality of channels 76. The lower portion 22 also includes a plurality of ribs 78 extending downwardly. As shown, the upper reinforcement frame 36 and the lower reinforcement frame 50 both have U-shaped cross sections opening downward. The fire-retardant coating 80 may also be placed inside the U-shaped channels of the upper reinforcement frame 36 and the lower reinforcement frame 50. Although the coating 80 is only illustrated on portions of the upper reinforcement frame 36 and the lower reinforcement frame 50, the entire surfaces of the upper reinforcement frame 36 and the lower reinforcement frame 50 would preferably receive the coating 80. The fire retardant coatings could be Aluminum Trihydrate (ATH), Intumescent material, Intumescent material combined with MDH and ATH, etc.

Figure 4:
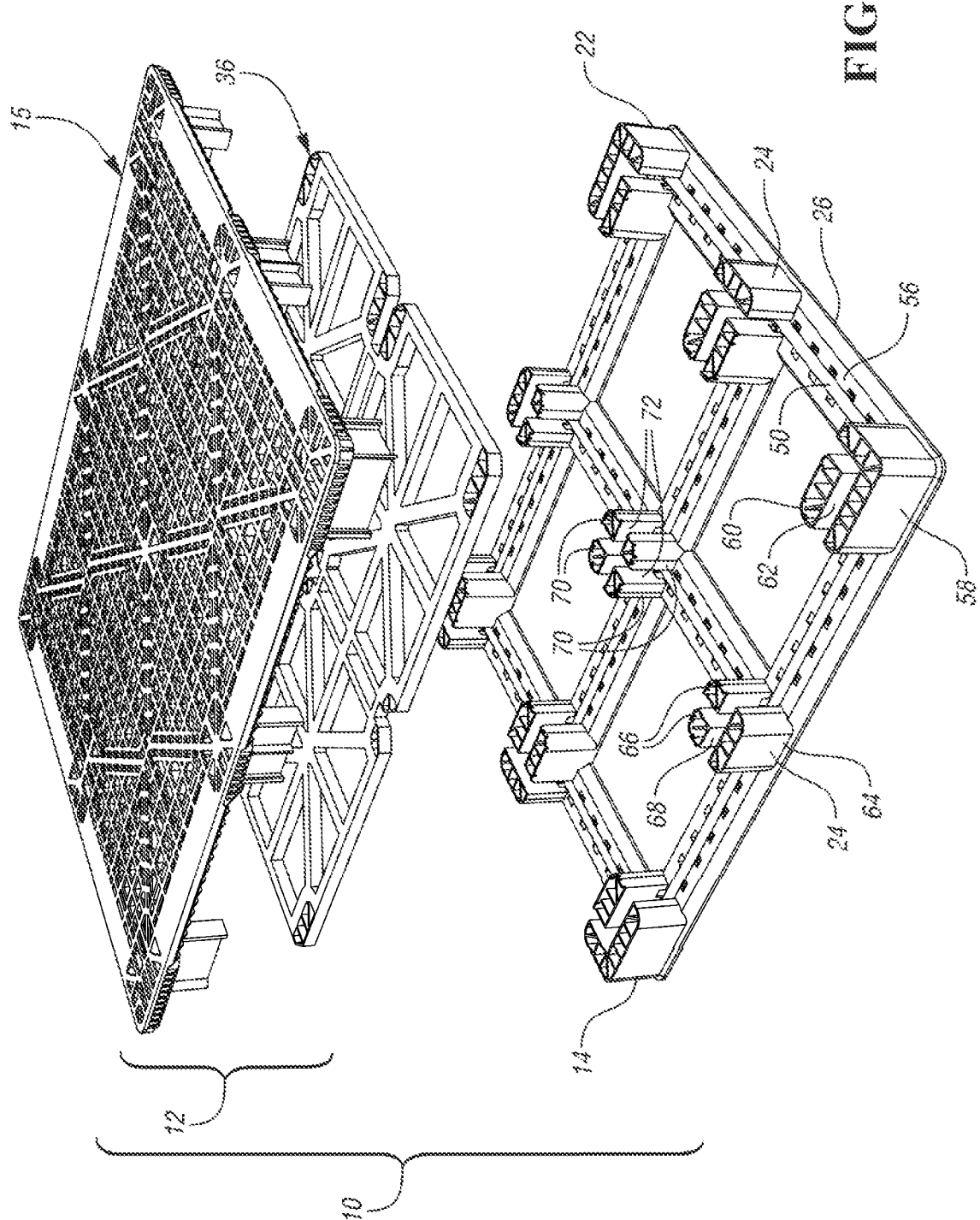
FIG. 4 is a partially exploded view of the pallet assembly of FIG. 1, with the lower reinforcement frame received in the lower portion.

FIG. 4 is an upper perspective view of the pallet assembly 10, partially exploded but with the lower assembly 14 assembled. As shown, the lower reinforcement frame 50 is received in the channel 56 in the lower portion 22, extending through the runners 26 and through the lower column portions 24, including through the channels 62, 68, 72 formed therethrough.

Figure 5:
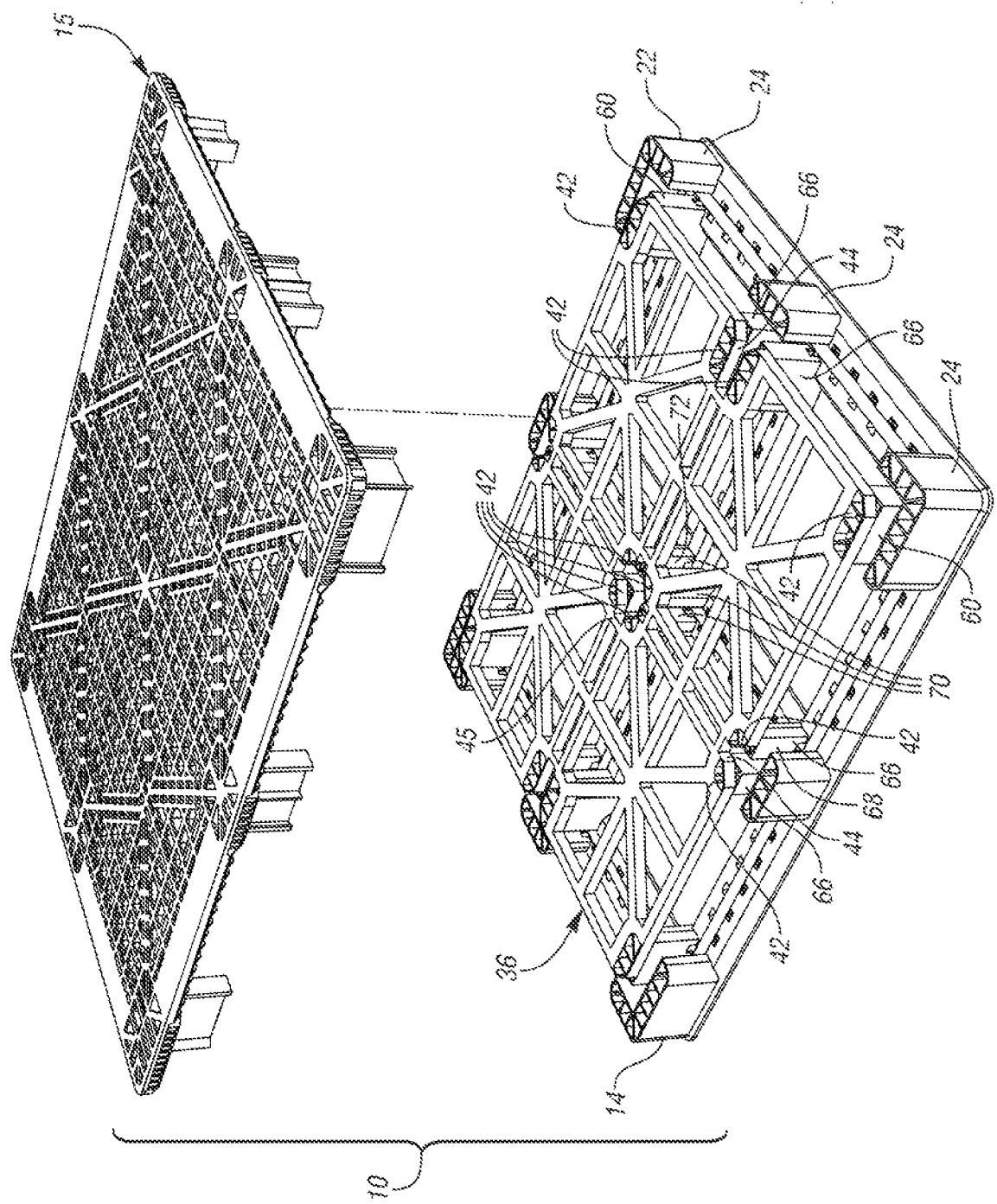
FIG. 5 is a partially exploded view of the pallet assembly of FIG. 1, with the lower reinforcement frame and the upper reinforcement frame on the lower portion.
Figure 6:
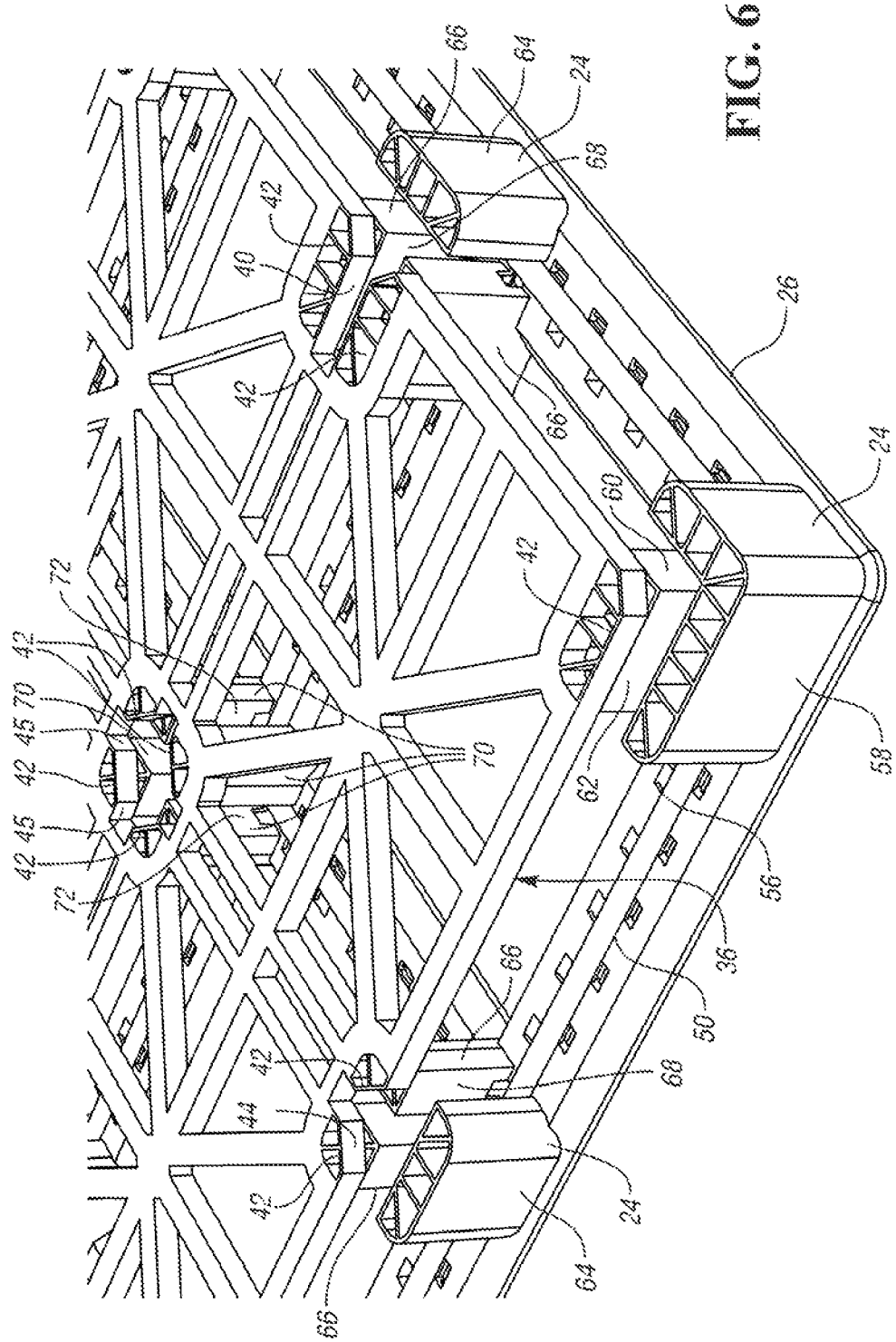
FIG. 6 is an enlarged view of a portion of FIG. 5.

FIG. 5 is similar to the view of FIG. 4, but with the upper reinforcement frame 36 placed on the lower assembly 14 to illustrate the alignment of those parts; however, during assembly, the upper reinforcement frame 36 would be placed into the upper portion 15 prior to the upper assembly 12 being secured to the lower assembly 14. FIG. 6 is an enlarged view of a portion of FIG. 5 for clarity. Referring to FIGS. 5 and 6, the column ribs 42 of the upper reinforcement frame 36 are positioned on the inner portions 60, 66, 70 of the lower column portions 24. In the corners, the upper reinforcement frame 36 does not extend over the L-shaped channel 62. At the non-corner peripheral lower column portions 24, the upper reinforcement frame 36 does not extend over the peripheral portions the T-shaped channels 68 and the notches 44 align with the perpendicular portions of the T-shaped channels 68. Notches 45 between the sets of column ribs 42 in the center of the upper reinforcement frame 36 are aligned with the channels 72 in the center lower column portion 24.

Figure 7:
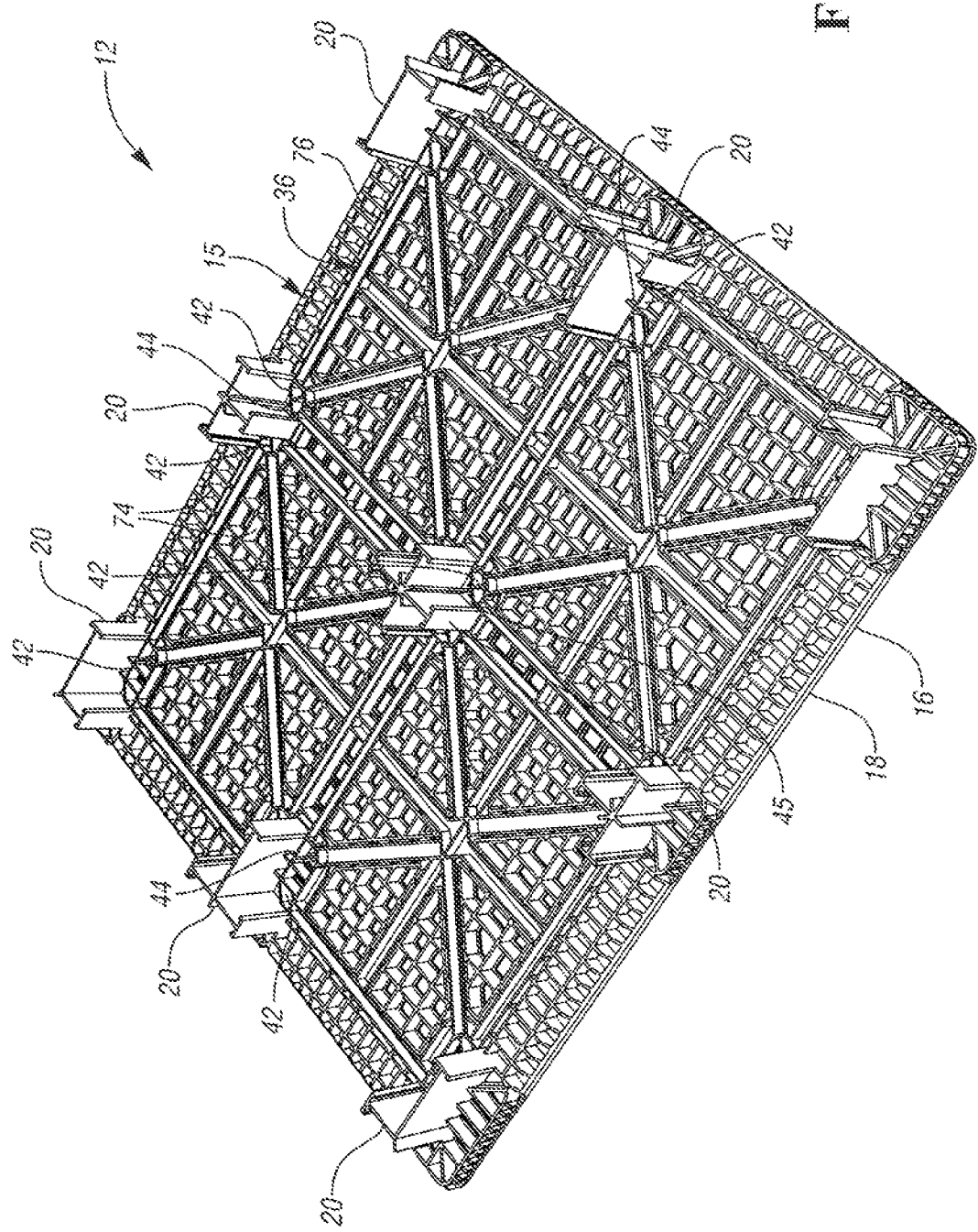
FIG. 7 is a bottom perspective view of the upper portion of the pallet assembly of FIG. 1.

FIG. 7 is a bottom perspective view of the assembled upper assembly 12. The upper reinforcement frame 36 is received in the channel 76 formed in the underside of the upper deck 16 against the upper planar portion 18 and between the ribs 74. The corner upper column portions 20 are positioned outward of the upper reinforcement frame 36. The non-corner peripheral upper column portions 20 are partially received in the notches 44 in the upper reinforcement frame 36. The center upper column portion 20 is received in the notches 45 in the center of the upper reinforcement frame 36 between the four sets of column ribs 42.

Figure 8:
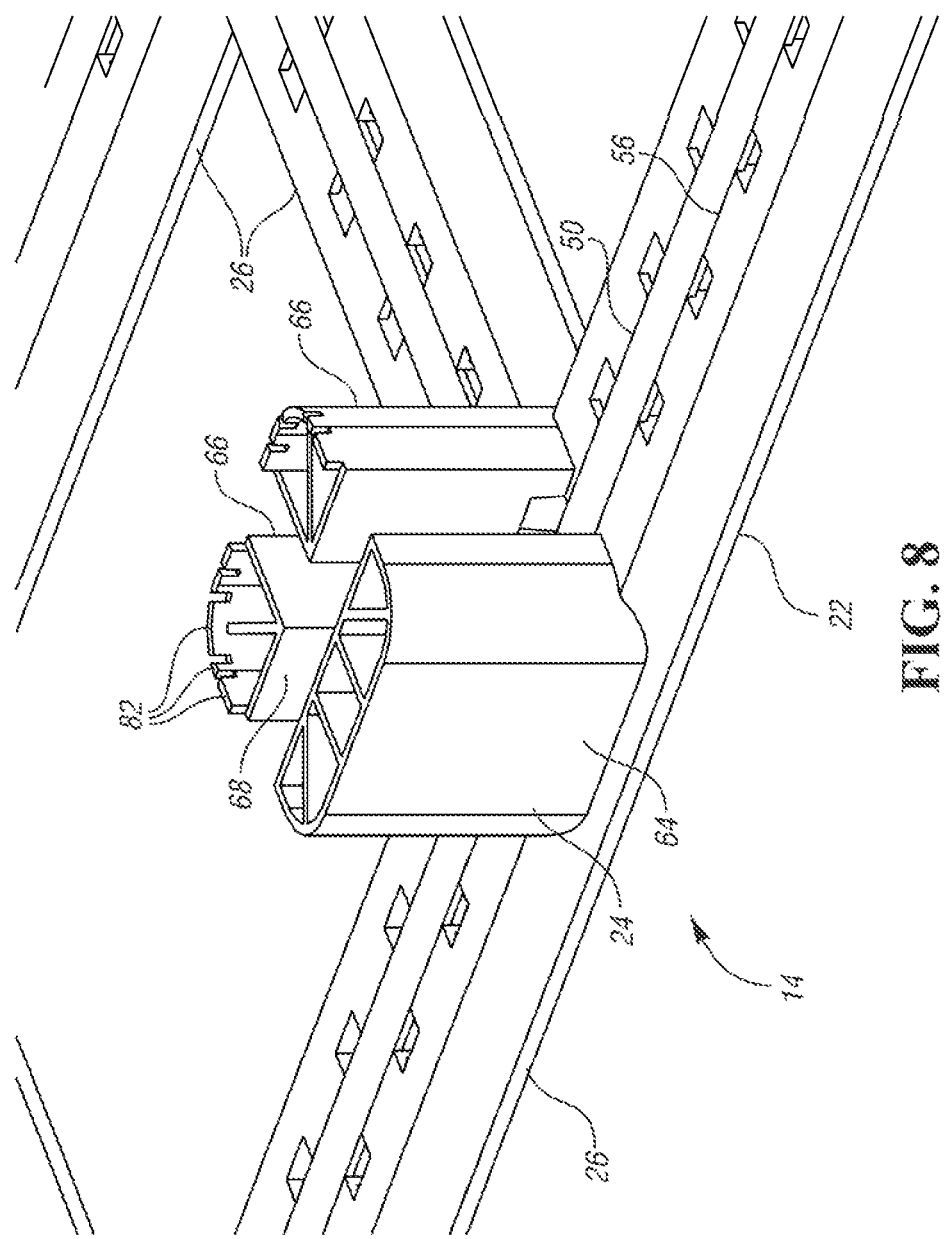
FIG. 8 is an enlarged view of one of the lower column portions and the lower reinforcement frame of FIG. 4.

FIG. 8 is an enlarged view of one of the lower column portions 24 of FIG. 4. As shown, the lower reinforcement frame 50 is received in the channel 56 in the lower portion 22, extending through the runners 26 and through the lower column portion 24, including through the channels 68 formed therethrough. The two spaced-apart inner side portions 66 may include tabs 82 or other connectors extending upwardly therefrom to assist in connecting to the upper portion 15 (FIG. 2). The upper portion 15 may be connected to the lower column portions 24 by welding, adhesive or snap-fit connections (not shown), as are all known.

Figure 9:
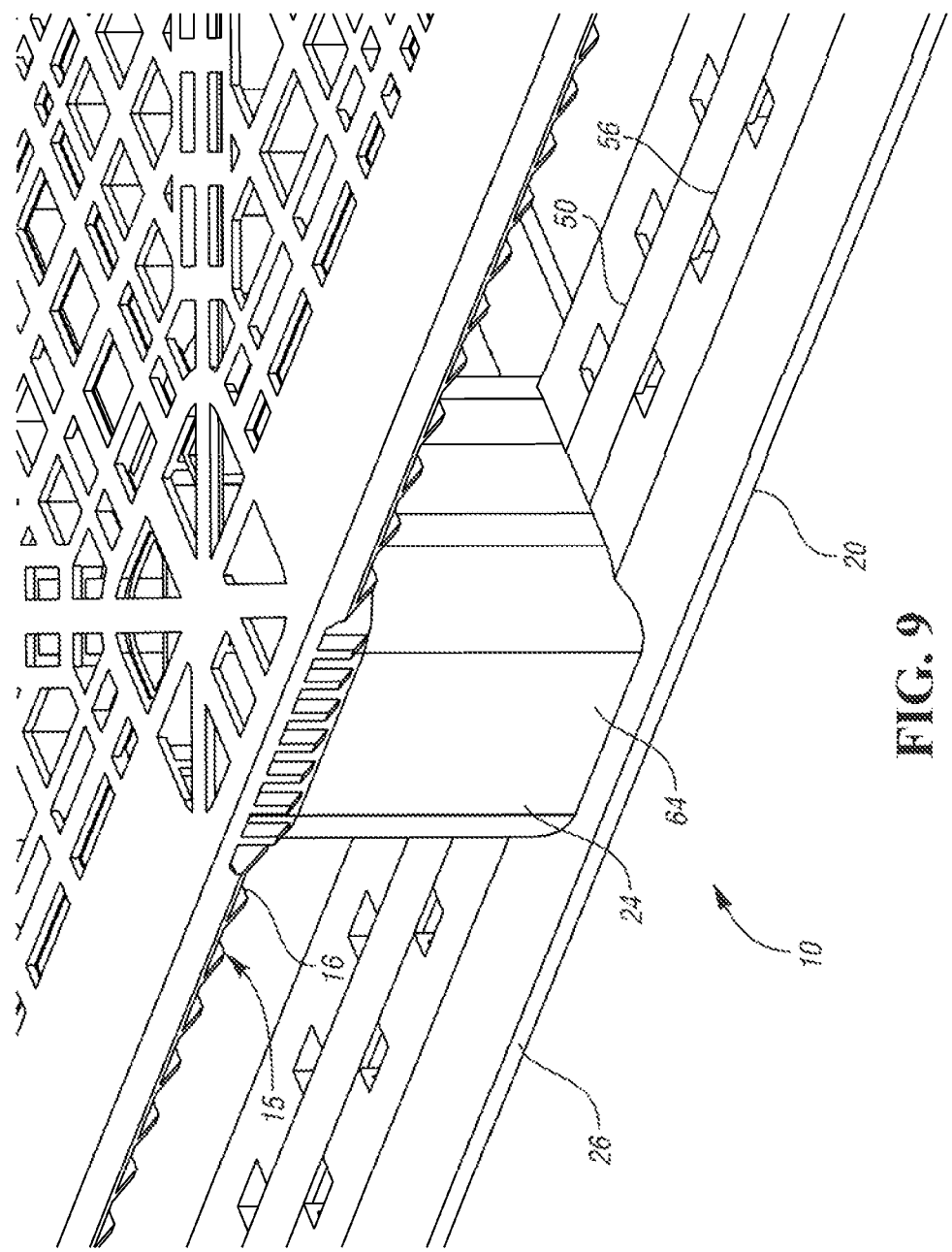
FIG. 9 shows the lower column portion of FIG. 8 with the upper portion and upper reinforcement frame assembled thereon to form the pallet assembly of FIG. 1.

FIG. 9 shows the lower column portion 24 of FIG. 8 with the upper portion 15 connected. The lower reinforcement frame 50 is held down in the channel 56 by the upper column portion 20. Some of the load on the upper deck 16 is transferred directly through the upper column portion 20 to the lower reinforcement frame 50.

Figure 10:
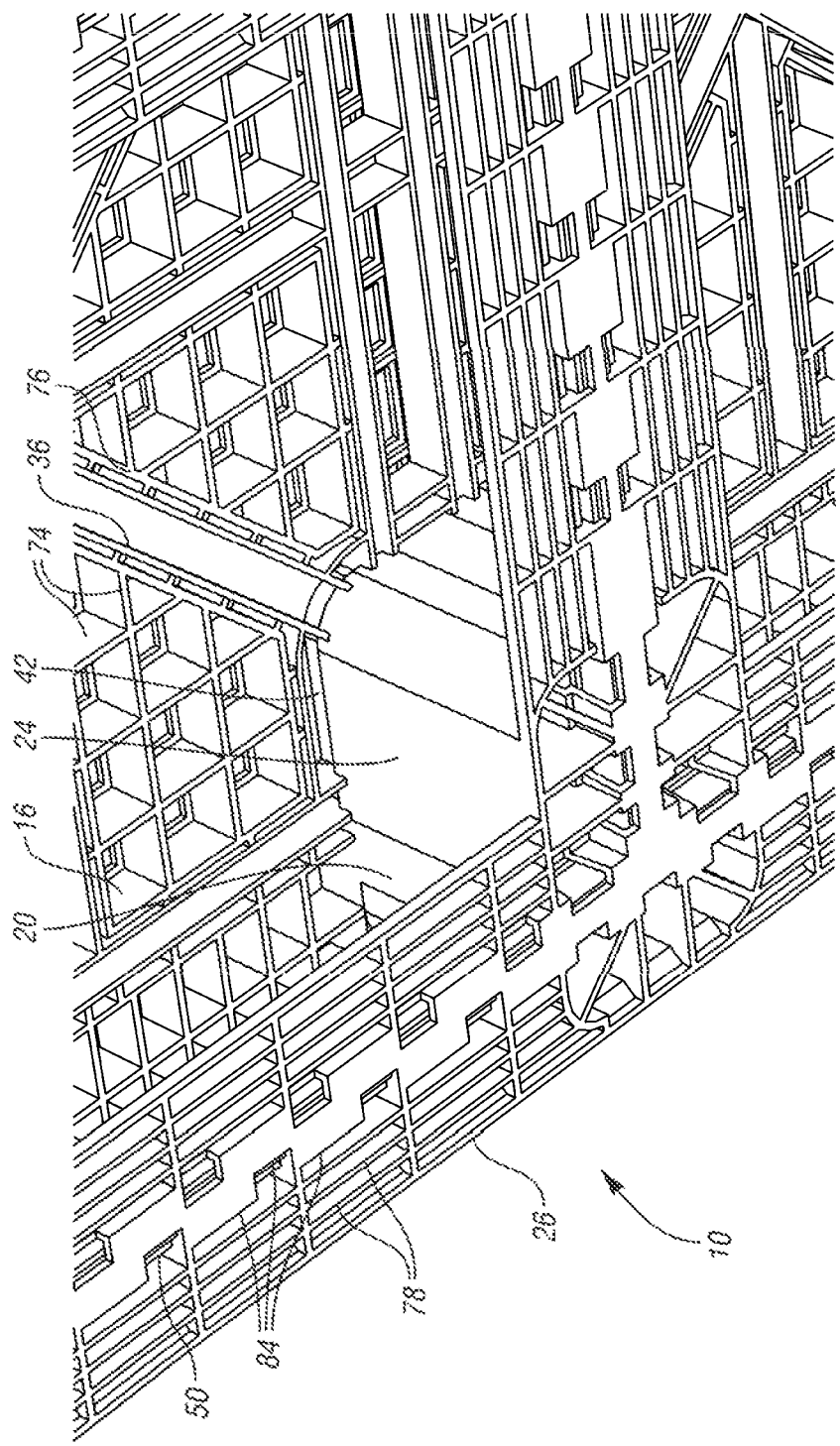
FIG. 10 is a bottom perspective view of the area around the column of FIG. 9.

FIG. 10 is a bottom perspective view of the column of FIG. 9. The runners 26 each include the plurality of ribs 78 projecting downward and a plurality of alternating offset horizontal walls 84 below the lower reinforcement frame 50 (i.e. below the channel 56, FIG. 9). The plurality of alternating offset horizontal walls 84 each expose a portion of the open channel of the lower reinforcement frame 50 for cleaning. The upper reinforcement frame 36 is held in the channel 76 of the upper deck 16 by the lower column portion 24. Other lower column portions 24 would hold the upper reinforcement frame 36 similarly. The column ribs 42 are captured between the lower column portions 24 and the upper deck 16.

Figure 11:
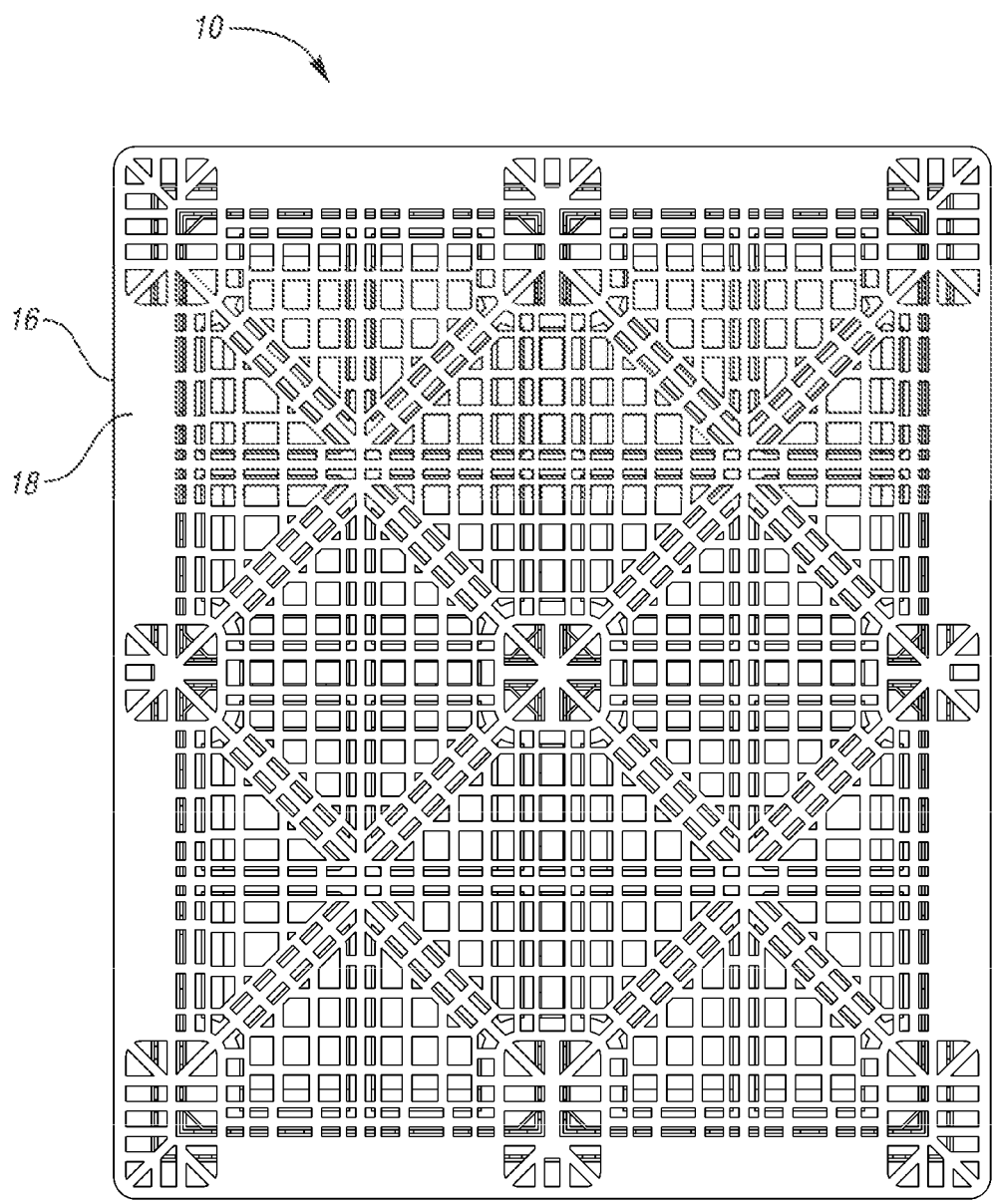
FIG. 11 is a top view of the pallet assembly of FIG. 1.
Figure 12:
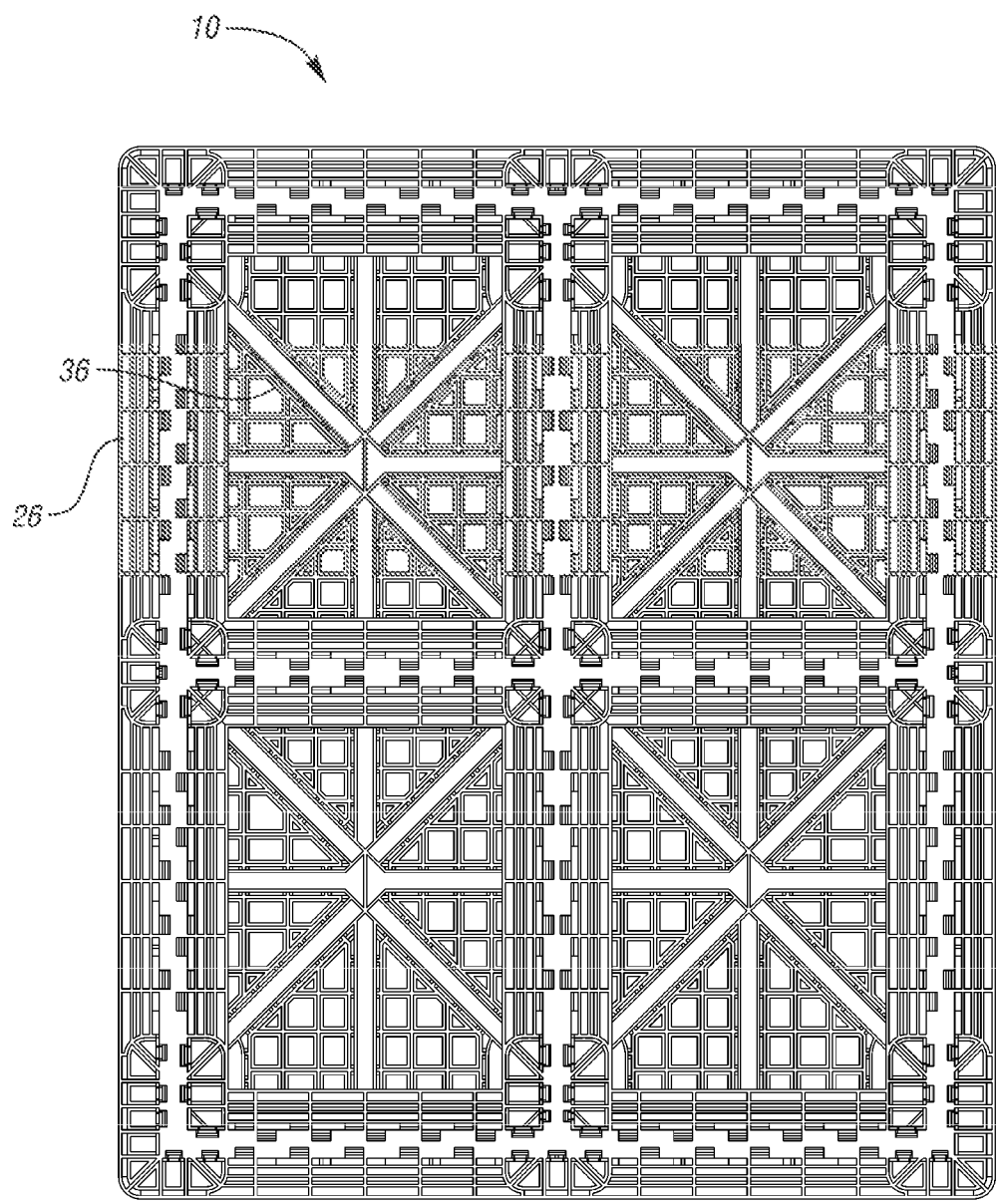
FIG. 12 is a bottom view of the pallet assembly of FIG. 1.

FIG. 11 is a top view of the pallet assembly 10. FIG. 12 is a bottom view of the pallet assembly 10. As shown in FIGS. 11 and 12, the upper deck 12 of the pallet assembly 10 is substantially open, with a plurality of apertures through the upper planar portion 18, such that approximately 50% of the area of the upper planar portion 18 is open. There is also substantial space between the runners, such that more than 50% of the area of the lower portion 22 is open vertically.

In use, because the pallet assembly 10 is substantially open, during a fire flames below the pallet assembly 10 will extend vertically through the pallet assembly 10 rather than being forced laterally outward of the pallet assembly 10. This may activate overhead sprinkler systems more quickly. Additionally, the flames will eventually melt or weaken the pallet assembly 10, including the plastic reinforcement frames 36, 50, until the pallet assembly 10 collapses onto the fire, somewhat damping the flames and exposing the fire retardant coatings 80 to the flames, also reducing the fire.

In the example pallet assembly 10 described above, the fire retardant coatings 80 are placed on the reinforcement frames 36, 50 and not the upper portion 15 or the lower portion 22. This makes the upper portion 15 and the lower portion 22 easy to recycle. The reinforcement frames 36, 50 can also be recycled after removal of the fire retardant coatings 80. Alternatively, some fire retardant coating 80 can also be placed on parts of the upper portion 15 and/or lower portion 22.

There is an optional assembly feature of the present invention which is demonstrated in the exemplary embodiment illustrated and described above. As explained above, the upper reinforcement frame 36 is secured to the upper portion 15 by the lower portion 22. Likewise, the lower reinforcement frame is secured to the lower portion 22 by the upper portion 15. Thus, during assembly there is only one joining operation, joining the upper portion 15 to the lower portion 22.

In the example pallet assembly 10 described above, it may not be necessary for the upper portion 15 and the lower portion 22 to have fire retardant additives in the plastic material of which they are molded. Optionally, if necessary, some fire retardant additives could be added to the upper portion 15 and/or lower portion 22, such as halogens or metal hydrates, but these additives could be limited to 5% for improved structural performance.

As another optional feature demonstrated in the example pallet assembly 10, the pallet assembly 10 is a substantially open design in that the pallet surfaces are easily cleaned and can be tested for sanitation with a standard swab test. The reinforcement frames 36, 50 are U-shaped channels (i.e. having a U-shaped cross-section) that are accessible for cleaning and testing.

The example pallet assembly 10 is a reinforced rackable pallet with runners. However it should be understood that other types of pallets, such as nestable pallets, could also benefit from one or more of the features disclosed herein. The example pallet is 40" by 48" by 5.6" but these inventions would be applicable to other size pallets as well.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A pallet assembly comprising:
   an upper portion including an upper deck and a plurality of upper column portions extending downward from the upper deck;
   a lower portion including a plurality of lower column portions extending upward and a plurality of runners connecting the plurality of lower column portions;
   an upper reinforcement member contacting an upper surface of the lower column portions and a lower surface of the upper deck; and
   a lower reinforcement member contacting a lower surface of the upper column portions and an upper surface of the runners.

2. The pallet assembly of claim 1 wherein the upper deck is integrally molded with the plurality of upper column portions.

3. The pallet assembly of claim 2 wherein the lower column portions are integrally molded with the runners.

4. The pallet assembly of claim 3 wherein the plurality of upper column portions interlock with the plurality of lower column portions.

5. The pallet assembly of claim 4 wherein the plurality of upper column portions are received in the plurality of lower column portions.

6. The pallet assembly of claim 4 wherein the upper surface of the lower column portions extends up to the lower surface of the upper deck and wherein the lower surface of the upper columns portions extends down to upper surface of the runners.

7. The pallet assembly of claim 5 wherein the upper reinforcement member is an upper reinforcement frame including a peripheral portion and a plurality of intersecting interior portions.

8. The pallet assembly of claim 7 wherein the upper reinforcement frame is molded plastic.

9. The pallet assembly of claim 8 wherein the upper reinforcement frame has a U-shaped cross section.

10. The pallet assembly of claim 9 wherein the upper reinforcement frame is formed of glass-filled Nylon or carbon fiber filled Nylon.

11. The pallet assembly of claim 7 wherein the lower reinforcement member is a lower reinforcement frame including a peripheral portion and a plurality of intersecting interior portions.

12. The pallet assembly of claim 11 wherein the lower portion includes a channel into which the lower reinforcement frame is received.

13. The pallet assembly of claim 12 wherein the channel is formed in the runners.

14. The pallet assembly of claim 13 wherein the channel extends though the lower column portions.

15. The pallet assembly of claim 14 wherein the plurality of upper column portions are received in the channel.

16. The pallet assembly of claim 7 further including a fire-resistant coating on the upper reinforcement member.

17. The pallet assembly of claim 1 wherein the upper deck includes an upper planar portion having a plurality of apertures therethrough, such that approximately 50% of the area of the upper planar portion is open.

18. A pallet assembly comprising:
    an upper portion including an upper deck and a plurality of upper column portions extending downward from the upper deck, wherein the upper deck is integrally molded with the plurality of upper column portions;
    a lower portion including a plurality of lower column portions extending upward and a plurality of runners connecting the plurality of lower column portions, the lower portion including a channel formed in the runners and the plurality of lower column portions; and
    a lower reinforcement member received in the channel in the lower portion, the upper column portions received in the channel in the lower column portions.

19. The pallet assembly of claim 18 wherein the lower reinforcement member has a U-shaped cross section opening downward.

20. The pallet assembly of claim 19 wherein the runners each include a plurality of alternating offset horizontal walls below the channel to provide access to the opening of the lower reinforcement member.

21. A pallet assembly comprising:
    an upper portion including an upper deck and a plurality of upper column portions extending downward from the upper deck;
    a lower portion including a plurality of lower column portions extending upward and a plurality of runners connecting the plurality of lower column portions; and
    an upper reinforcement frame between an upper surface of the lower column portions and a lower surface of the upper deck, the upper reinforcement frame including a peripheral portion extending about a periphery of the upper deck, the upper reinforcement frame further including a plurality of intersecting interior portions extending inward from the peripheral portion, the upper reinforcement frame further including a plurality of notches formed by the peripheral portion wherein the plurality of upper column portions are received in the plurality of notches.

22. The pallet assembly of claim 21 wherein the upper deck is integrally molded with the plurality of upper column portions, the lower column portions are integrally molded with the runners, and the plurality of upper column portions interlock with the plurality of lower column portions.

23. The pallet assembly of claim 11 wherein the upper reinforcement frame contacts the upper surface of the lower column portions and the lower surface of the upper deck.

\* \* \* \* \*

UNITED STATES PATENT AND TRADEMARK OFFICE
CERTIFICATE OF CORRECTION

PATENT NO. : 10,532,852 B2  Page 1 of 1
APPLICATION NO. : 16/006923
DATED : January 14, 2020
INVENTOR(S) : William P. Apps and Christopher N. Gab It is certified that error appears in the above-identified patent and that said Letters Patent is hereby corrected as shown below:

In the Claims

In Claim 23, Column 7, Line 1; replace "claim 11" with --claim 22--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*